US009073614B2

(12) United States Patent
Kauffman

(10) Patent No.: US 9,073,614 B2
(45) Date of Patent: Jul. 7, 2015

(54) DEVICE AND SYSTEM FOR CLEANING A SURFACE IN A MARINE ENVIRONMENT

(71) Applicant: Phillip Kauffman, Encinitas, CA (US)

(72) Inventor: Phillip Kauffman, Encinitas, CA (US)

(73) Assignee: Carl Nettleton, San Diego, CA (US)

( * ) Notice: Subject to any disclaimer, the term of this patent is extended or adjusted under 35 U.S.C. 154(b) by 0 days.

(21) Appl. No.: 14/188,327

(22) Filed: Feb. 24, 2014

(65) Prior Publication Data

US 2014/0237740 A1 Aug. 28, 2014

Related U.S. Application Data

(60) Provisional application No. 61/770,948, filed on Feb. 28, 2013.

(51) Int. Cl.
| | |
|---|---|
| *B08B 1/00* | (2006.01) |
| *B63B 59/08* | (2006.01) |
| *A01K 61/00* | (2006.01) |
| *E04H 4/16* | (2006.01) |

(52) U.S. Cl.
CPC ............... *B63B 59/08* (2013.01); *E04H 4/1654* (2013.01); *A01K 61/003* (2013.01); *B08B 1/00* (2013.01); *E04H 4/16* (2013.01)

(58) Field of Classification Search
USPC .......................... 15/1.7, 409, 415.1, 301, 308
See application file for complete search history.

(56) References Cited

U.S. PATENT DOCUMENTS

| 4,184,291 | A | * | 1/1980 | Marton | 451/344 |
|---|---|---|---|---|---|
| 4,199,837 | A | * | 4/1980 | Fisco, Jr. | 15/302 |
| 4,697,389 | A | * | 10/1987 | Romine | 451/354 |
| 5,007,206 | A | * | 4/1991 | Paterson | 451/344 |
| 5,077,862 | A | * | 1/1992 | Rench | 15/384 |
| 5,082,028 | A | * | 1/1992 | Leonard | 138/118 |
| 5,283,988 | A | * | 2/1994 | Brown | 451/524 |
| 5,317,776 | A | * | 6/1994 | DeMoura | 15/1.7 |
| 5,337,434 | A | * | 8/1994 | Erlich | 15/1.7 |
| 5,351,355 | A | * | 10/1994 | Chiniara | 15/1.7 |
| 5,404,607 | A | * | 4/1995 | Sebor | 15/1.7 |
| 5,454,129 | A | * | 10/1995 | Kell | 15/1.7 |
| 5,690,545 | A | * | 11/1997 | Clowers et al. | 451/359 |
| 5,725,761 | A | * | 3/1998 | Phillips | 210/167.11 |
| 5,797,156 | A | * | 8/1998 | Sebor | 15/1.7 |
| 5,974,647 | A | * | 11/1999 | Sebor | 29/434 |
| 5,985,156 | A | * | 11/1999 | Henkin et al. | 210/744 |
| 6,199,237 | B1 | * | 3/2001 | Budden | 15/1.7 |
| 6,652,742 | B2 | * | 11/2003 | Henkin et al. | 210/167.16 |
| 7,033,259 | B1 | * | 4/2006 | Seasholtz et al. | 451/354 |
| 7,060,182 | B2 | * | 6/2006 | Erlich et al. | 210/167.16 |

(Continued)

*Primary Examiner* — Monica Carter
*Assistant Examiner* — Michael Jennings
(74) *Attorney, Agent, or Firm* — Eleanor M. Musick; Greer Burns & Crain LLP

(57) ABSTRACT

A system for cleaning an underwater surface includes a cleaning head having a base with a scrubbing pad attached thereto, a hollow handle having leg portions that are connected to openings through the base and an extension tube open toward a rear portion of the cleaning head. A flexible skirt extends perpendicular to the lower surface of the base to surround the sides of the scrubbing pad. A water pump is connected to the extension tube of the handle via a hose to draw water through the base openings to produce a partial vacuum in a space between the base, the skirt and the underwater surface. In one embodiment at least one mechanical filter is disposed downstream of the cleaning head. The system may further include at least one biological and/or chemical filter disposed downstream of the cleaning head.

7 Claims, 2 Drawing Sheets

(56) References Cited

U.S. PATENT DOCUMENTS

| | | | |
|---|---|---|---|
| 7,284,565 B2* | 10/2007 | Sebor | 137/114 |
| 7,908,696 B2* | 3/2011 | Pareti | 15/1.7 |
| 8,100,745 B2* | 1/2012 | Zhang et al. | 451/357 |
| 8,343,339 B2* | 1/2013 | Sumonthee | 210/167.16 |
| 8,590,088 B2* | 11/2013 | Bauckman et al. | 15/1.7 |
| 2004/0040581 A1* | 3/2004 | Bruwer | 134/18 |
| 2004/0049878 A1* | 3/2004 | Thomas et al. | 15/320 |
| 2004/0133999 A1* | 7/2004 | Walton | 15/1.7 |
| 2004/0168299 A1* | 9/2004 | Porat et al. | 29/596 |
| 2004/0194237 A1* | 10/2004 | Walton | 15/1.7 |
| 2007/0039859 A1* | 2/2007 | King et al. | 210/97 |
| 2007/0089228 A1* | 4/2007 | Sidler | 4/490 |
| 2010/0011521 A1* | 1/2010 | Collins | 15/1.7 |
| 2011/0023259 A1* | 2/2011 | Nuhn | 15/340.1 |
| 2012/0040594 A1* | 2/2012 | Brown | 451/344 |
| 2012/0118326 A1* | 5/2012 | Schumacher | 134/21 |
| 2012/0137451 A1* | 6/2012 | Bauckman et al. | 15/1.7 |
| 2012/0174326 A1* | 7/2012 | Finezilber | 15/1.7 |
| 2012/0210527 A1* | 8/2012 | Erlich et al. | 15/1.7 |
| 2013/0152317 A1* | 6/2013 | Erlich et al. | 15/1.7 |
| 2013/0189060 A1* | 7/2013 | Lamonte | 414/507 |

* cited by examiner

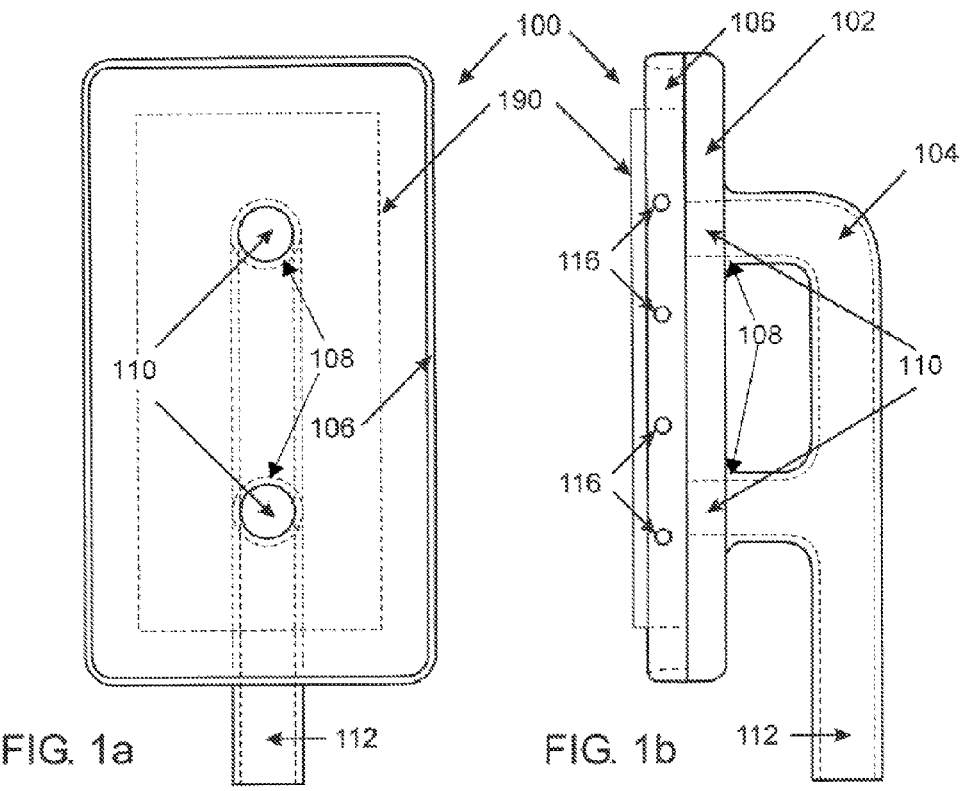
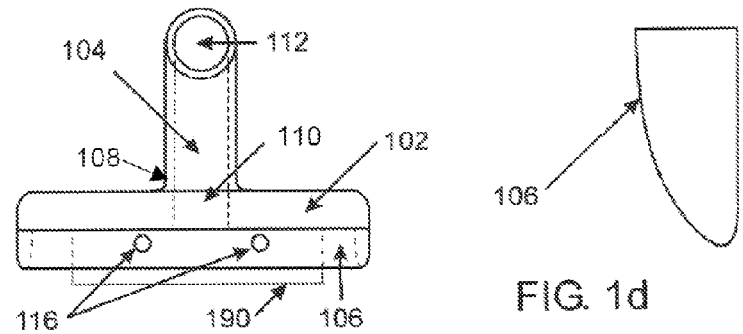

DEVICE AND SYSTEM FOR CLEANING A SURFACE IN A MARINE ENVIRONMENT

RELATED APPLICATIONS

This application claims the benefit of the priority of U.S. Application No. 61/770,948, filed Feb. 28, 2013, which is incorporated herein by reference.

FIELD OF THE INVENTION

The present invention relates to hand-held cleaning tools and, more particularly, to hand-held cleaning tool and a system incorporating such a tool for effectively removing algae and other marine growth from underwater surfaces while containing any contaminants resulting from use of the tool.

BACKGROUND OF THE INVENTION

Marine growth is a constant maintenance issue for anyone that owns a dock, boat, or other aquatic vessel or structure. The accumulation of algae and invertebrates (mussels, barnacles, limpets) can cause significant expense for operators of commercial shipping in particular. Marine growth can result in greater wear and tear, significant increase in fuel consumption if not treated (10%-15%) and substantial maintenance costs. Also of concern is the transportation of invasive plant and animal species from their native regions to other areas through commercial shipping.

The most expedient way of cleaning the underside of a boat hull is to haul the boat out of the water so that access can be had to all of the under surfaces of the boat apart from the water in which they are usually submerged. However, hauling a boat out of the water is expensive, and doing so every time the hull needs to be cleaned, which is once every three to four weeks, would be prohibitive.

Attempts have been made to address the marine growth problem by using anti-fouling paints on surfaces, such as ships hulls, likely to be affected. Many anti-fouling paints, however, have been found to be damaging to the environment because they contain heavy metals and are considered to be pesticides. Many countries have banned or are considering implementing bans on the use of such anti-fouling paints and even on entry of ships bearing anti-fouling paints into the country's waterways. Further, anti-fouling paints can be expensive to purchase and apply and require re-application periodically. Even so, these paints and other similar protective coatings continue to be used and must be cleaned, with each cleaning releasing environmentally harmful contaminants from the surface of the paints.

For larger ships, mechanical scrubbing techniques utilizing brush cleaning machines or the like have been used to remove marine growth while the vessel is in the water. For smaller vessels such as recreational boats, the cleaning procedures are typically performed by divers using hand-held tools including hand-held scrubbing pads and brushes. For larger scale cleaning operations on commercial vessels, sophisticated hydraulic cleaning equipment and heavy duty scrubbers may be operated from one or more specially-fitted workboats in conjunction with trained divers, or remote controlled self-propelled vehicles may be used. Regardless of the scrubbing mechanism, the scrubbing action can release particulates into the water, with the risk of dissemination of invasive flora or fauna, or chemicals, including heavy metals from anti-fouling paints, which can harm local marine life and impact water quality. Some areas may prohibit or restrict the use of such equipment due to the environmental effects on the marine life in areas where the mechanical cleaning occurs.

The need remains for a device and system for cleaning boat hulls and other submerged surfaces in marine environments that provide effective scrubbing capability while minimizing the release of particulates and other pollutants into the water. The present invention is directed to such a need.

BRIEF SUMMARY

According to the present invention, a cleaning head is connected via a hose to a pump that draws water away from the cleaning head so as to produce a vacuum between the head and the surface that is being cleaned. The water drawn through the pump is directed through one or more filters prior to discharge into the surrounding water.

The cleaning head comprises a base/handle portion, a scrubbing pad attached to the base and a skirt that extends from the base. The handle is formed by hollow tubes that are connected to openings through the base at one end and connect to the vacuum hose at the other end, so that water is drawn through the base. The skirt is a flexible rubber or rubber-like ridge that extends around the perimeter of the base to define a space from which water, along with any particulate materials in the water, is drawn. The scrubbing pad provides means for removing dirt and undesirable materials from the work surface, or may be used for polishing the work surface. When the skirt is pressed against a flat surface such as a boat hull, a partial vacuum is generated within the space so that any materials or other water-borne contaminants within the space are drawn into the handle and through to the pump. It may be desirable to include several small openings through the sides of the skirt to draw water into the system, and to prevent the vacuum from becoming so strong as to prevent the cleaning head from being moved across the work surface.

In an exemplary embodiment, one or more mechanical filters may be placed downstream of the pump to capture contaminants. The mechanical filter(s) may be multi-stage filters with progressively finer levels of filtration. A biological and/or chemical ("bio/chem") filter may be placed downstream of the mechanical filter. Optional water viewers may be placed between the pump and the mechanical filter and between the bio/chem filter and the discharge to allow the water to be visually checked to determine the level of particulates going into and out of the filtration stages.

In one aspect of the invention, a system is provided for cleaning an underwater surface, the system including a cleaning head comprising a base having an upper surface and a lower surface; a scrubbing pad attached to the lower surface; a C-shaped handle extending from the upper surface of the base, the handle having a tubular structure with leg portions penetrating the base to define openings through the base and further having an extension tube open toward a rear portion of the cleaning head; and a skirt extending perpendicular to the lower surface of the base, the skirt comprising a flexible material adapted for creating a partial vacuum seal when the lower surface of the base is held against the underwater surface; a water pump; a hose for connecting the extension tube to the water pump so that water is drawn through the openings to produce a partial vacuum in a space between the base, the skirt and the underwater surface; and a discharge disposed downstream of the pump. In an exemplary embodiment at least one mechanical filter is disposed downstream of the cleaning head. The system may further include at least one biological and/or chemical filter disposed downstream of the cleaning head. Optional viewers may be disposed upstream of the discharge.

In another aspect of the invention, a cleaning head is provided for cleaning an underwater surface, the cleaning head including a base having an upper surface and a lower surface; a scrubbing pad attached to the lower surface; a handle having a grip portion and at least two leg portions extending between the grip and the upper surface of the base, the handle having a tubular structure wherein leg portions penetrate the base to define openings through the base and further having an extension tube open toward a rear portion of the cleaning head; and a skirt extending perpendicular to the lower surface of the base, the skirt comprising a flexible material adapted for creating a partial vacuum seal when the lower surface of the base is held against the underwater surface.

BRIEF DESCRIPTION OF THE DRAWINGS

The present invention will be better understood from the following detailed description of some preferred embodiments of the invention, taken in conjunction with the accompanying drawings, in which like numbers correspond to like parts, and in which:

FIGS. 1a-1d illustrate the cleaning head according to an embodiment of the invention, where FIG. 1a is a bottom view of the tool, FIG. 1b is a side view, FIG. 1c is an end view, and FIG. 1d is a detail view of the skirt.

DETAILED DESCRIPTION

Figure 2:
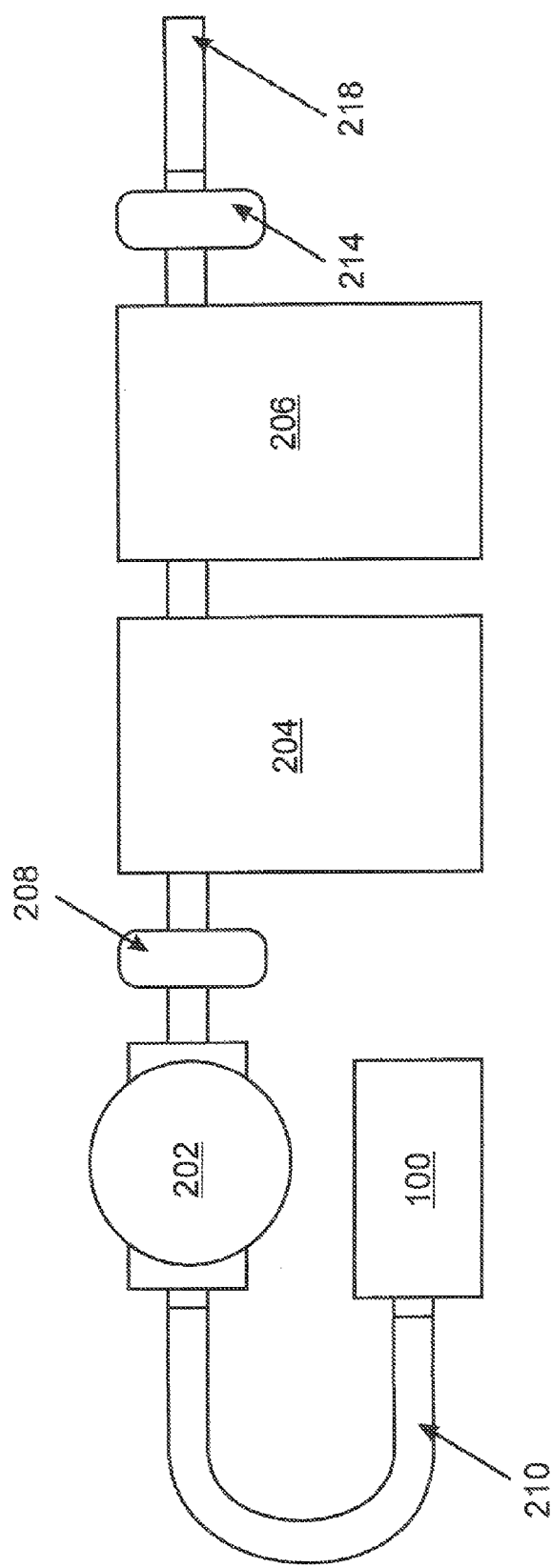
FIG. 2 shows a block diagram of the system of the present invention.

As shown in FIGS. 1a-1d, the cleaning head 100 comprises a base 102, a handle 104, a scrubbing pad 190, and a skirt 106 that extends from the base. The handle 104 has a C- or U-shape defining a grip and at least two legs that extend from the upper surface of the base. This handle 104 is formed with hollow tubes that are connected to openings 110 through the base 102 at first ends 108 and connect to the vacuum hose 210 (shown in FIG. 2) at the other end 112, so that water is drawn through the base and the hollow handle. The scrubbing pad 190 provides a surface for removing algae growth and other materials that may have accumulated on the work surface. Such pads, which vary in coarseness from very soft to very abrasive, are known in the art and includes rugs (pieces of carpet), steel wool and synthetic steel wool substitutes such as products sold by 3M under the trademarks SCOTCH-BRITE® and DOODLEBUG™, and similar scrubbing devices. In one embodiment, the scrubbing pad may be attached to the lower surface of the base 102 by a releasable fastener, such as a hook and pile fastener, snaps, or other known attachment means, in order to allow worn pads to be replaced as well as facilitating the use of interchangeable pads with different coarsenesses based on the nature of the work surface. In one embodiment, the pad may be a polishing or buffing pad, with a relatively low level of abrasiveness to produce a smooth finish. The pad may also be similar in texture to sandpaper, for example, sanding sponges, which are widely commercially available. In another embodiment, the scrubbing mechanism may be a brush with stiff bristles. For purposes of the invention, the term "scrubbing pad" includes scrub brushes, sponges, cloths, carpet and other materials or devices that are generally used to perform a scrubbing function. The pad 190 may have openings therethrough corresponding to openings 110 in the base to allow water and the removed materials to be freely drawn into the handle. Alternatively, if the pad has a sufficiently open weave, the vacuum and water may be drawn directly through the pad structure without requiring openings to be formed in the pad.

The skirt 106 is a soft, flexible rubber or rubber-like ridge that extends around the perimeter of the base to define a space from which water, along with any particulate materials in the water, is drawn. The vacuum space defined by the skirt as it presses against the work surface traps materials removed by the scrubbing action, preventing their release into the surrounding water. FIG. 1d shows an exemplary cross-sectional shape of the skirt, which tapers toward the outer edge 114, providing additional flexibility as the cleaning head is moved to maximize capture of contaminated materials. When not in use, the outer surface of the pad 190 appears to extend beyond the edge of the skirt, as shown in FIGS. 1b and 1c. Nonetheless, when pressure is applied to the cleaning head, the pad 190 will be compressed against the work surface so that it is fully contained within the vacuum space.

The base 102 and handle 104 may be formed from a hard, rigid plastic or polymer, e.g., polypropylene or polyethylene, by extrusion, injection molding, blow molding, or other appropriate plastic forming process. Exemplary dimensions for the base are a width of around 180 mm (~7.5 inches), a length of around 317 mm (12.5 inches) and a thickness within the range of 19 mm (0.75 inch) to 323 mm (1.25 inch) or slightly larger. Selection of an appropriate thickness will be based on the rigidity of the material, so that the handle and base are as hard as possible.

When the skirt 106 is pressed against a flat surface such as a boat hull, a partial vacuum is generated within the space defined by the skirt and the work surface so that any loose materials within the space are drawn into the handle 104 and through to the pump. It may be desirable to include several small openings 116 through the sides of the skirt 106 to draw water into the system, and to prevent the vacuum from becoming so strong as to prevent the cleaning head from being moved across the work surface.

FIG. 2 illustrates the components of the cleaning system. Cleaning head 100 is connected via a flexible intake hose 210 to a pump 202. It should be noted that only the cleaning head is operated underwater. The hose 210 is preferably fairly long, on the order of 30 to 60 feet, and relatively flexible to allow the user to move freely around the work surface. An exemplary diameter is on the order of 38 mm (~1.5 inch). Pump 202, which may range from ½ HP to around 3 HP, may be electric or fueled by gasoline or other fuel. In a preferred embodiment, pump 202 will include stainless steel components at all locations where water contact will occur, to enhance longevity. In addition, considerations for pump components will include avoiding use of metals such as copper, brass or bronze that could release metal elements into the discharged water. The pump is responsible for creating a powerful vacuum at the cleaning head and as well as pushing the water drawn in by the vacuum through the filtration modules and out the discharge. The pump 202 may be connected via a PVC pipe (e.g., 38 mm (~1.5 inch)) to the first stage of filtration 204. Optional intake water viewer 208 is connected downstream from pump 202 to allow the user, or an assistant, to observe the amount of particulates and other visibly-detectable contaminants that may be coming off of the work surface. The water is then directed through one or more filters to capture particles and larger chunks of material. A single mechanical filter 204 is illustrated. This filter may be a single stage or multi-stage filter, and there may be a series of mechanical filters including cartridge, stormwater or other types of filters as are known in the art, with each subsequent filter providing a progressively finer level of filtration. For example, a first stage of a two stage filter may have a 20 micron filter, with a second stage having a 1 micron filter. An additional mechanical filter may be positioned downstream from the two stage filter, with one or more 0.35 micron filter cartridges. Downstream from the mechanical filter(s) is a biological and/or chemical ("bio/chem") filter 206, connected via another section of PVC pipe. Appropriate chemical filters may include charcoal, diatomaceous earth, or other materials that are known to extract biological or chemical agents from water. An optional module (not shown) may include a UV sterilizer or other treatment device to reduce the amount of microorganisms that are returned to the nearby water. Optional water viewer 214 may be placed between the bio/chem filter 206 and the discharge 218 to allow the water to be observed to determine the level of particulates coming out of the filtration stages. It should be noted that unaided visual observation of the water at this point in the process is not a true measure of the effectiveness of the particulate filtration process because most of the particulates will be in the submicron range and, therefore, invisible to the naked eye. However, if desired, additional observation capability can be provided through the use of appropriate optics and/or liquid particle counters. The entire system may produce a flow rate of 7-20 gallons per minute.

In an alternative embodiment, pump 202 may be placed downstream of the mechanical filter 204 and possibly downstream of the bio/chem filter 206 without changing the basic operation or effectiveness of the system.

In a preferred embodiment, all of the equipment (pump, filters, connecting hoses and optional viewers) may be mounted on a cart with lockable wheels. Efficiency can be further enhanced by including compartments or hooks for carrying diving equipment, including oxygen tanks, and tools.

During use, the person performing the cleaning will move the cleaning head 100 with the planar portion of the base 102 parallel with the work surface. As the cleaning head 100 is pressed against the work surface, the scrubbing pad 190 removes the materials from the surface. The skirt 106 prevents removed materials from being released into the water, while the vacuum created by the pump 202 draws the particulate- and chemical-bearing water into the filtration system. After filtration, the water is discharged from a discharge hose 218 which is preferably positioned at a location that will not interfere with the cleaning operation or disturb marine life in the area.

The invention provides an environmentally-responsible way of cleaning boat hulls and other underwater surfaces using a system that is readily transportable and easy to handle.

It will be readily apparent to those in the art that additional components may be added to the system without changing the overall character or function of the inventive system.

The invention claimed is:

1. A system for cleaning an underwater surface, comprising:
    a cleaning head comprising:
        a base having an upper surface and a lower surface;
        a scrubbing pad disposed on the lower surface of the base;
        a handle extending from the upper surface of the base, the handle comprising a tubular structure with leg portions penetrating the base to define openings through the base and further having an extension tube open toward a rear portion of the cleaning head;
        a skirt extending perpendicular to the lower surface of the base, the skirt comprising a flexible material adapted for creating a partial vacuum seal when the lower surface of the base is held against the underwater surface;
    a water pump;
    a hose for connecting the extension tube to the water pump so that water is drawn through the openings to produce a partial vacuum in a space between the base, the skirt and the underwater surface; and
    a discharge disposed downstream of the pump.

2. The system of claim 1, further comprising at least one mechanical filter disposed downstream of the cleaning head.

3. The system of claim 1, further comprising at least one biological and/or chemical filter disposed downstream of the cleaning head.

4. The system of claim 1, further comprising one or more viewers disposed upstream of the discharge.

5. The system of claim 1, wherein the skirt has a plurality of openings formed therethrough.

6. The system of claim 1, where the scrubbing pad is releasably attached to the base.

7. The system of claim 1, wherein the scrubbing pad comprises an abrasive material selected from the group consisting of scrub brushes, sponges, cloths, carpet and synthetic steel wool substitutes.

* * * * *